(12) United States Patent
Shimaoka et al.

(10) Patent No.: US 7,201,498 B2
(45) Date of Patent: Apr. 10, 2007

(54) LIGHTING APPARATUS

(75) Inventors: Yusaku Shimaoka, Osaka (JP);
Kazunori Horikawa, Nara (JP); Hideki Ishinaga, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 422 days.

(21) Appl. No.: 10/497,300

(22) PCT Filed: Oct. 6, 2003

(86) PCT No.: PCT/JP03/12759

§ 371 (c)(1),
(2), (4) Date: Jun. 1, 2004

(87) PCT Pub. No.: WO2004/034142

PCT Pub. Date: Apr. 22, 2004

(65) Prior Publication Data

US 2005/0024602 A1    Feb. 3, 2005

(30) Foreign Application Priority Data

Oct. 10, 2002   (JP) ............................. 2002-298001

(51) Int. Cl.
*F21V 17/02* (2006.01)
*F21V 7/00* (2006.01)

(52) U.S. Cl. ................. 362/319; 362/247; 353/81
(58) Field of Classification Search ................ 362/247, 362/319, 322–323; 353/81
See application file for complete search history.

(56) References Cited

U.S. PATENT DOCUMENTS

| | | | |
|---|---|---|---|
| 5,098,184 A | * | 3/1992 | van den Brandt et al. .. 353/102 |
| 5,300,966 A | * | 4/1994 | Uehira et al. .................. 353/30 |
| 5,504,544 A | * | 4/1996 | Dreyer et al. .................. 353/38 |
| 5,580,142 A | * | 12/1996 | Kurematsu et al. ........... 353/31 |
| 5,600,487 A | * | 2/1997 | Kiyomoto et al. .......... 359/634 |
| 5,649,753 A | * | 7/1997 | Masumoto .................. 353/102 |

(Continued)

FOREIGN PATENT DOCUMENTS

JP    7-319068    12/1995

(Continued)

OTHER PUBLICATIONS

International Search Report corresponding to application No. PCT/JP03/12759 dated Dec. 2, 2003.

*Primary Examiner*—Ali Alavi
(74) *Attorney, Agent, or Firm*—RatnerPrestia

(57) ABSTRACT

In recent years, much attention has been paid to a projection type display apparatus using a plurality of light sources, as projection type video equipment capable of large screen display. However, in an optical system using a plurality of light sources, devices are designed so that uniform lighting can be provided assuming only the use of all the light sources. Thus, the uniformity of brightness within a display screen may be degraded if not all of the plurality of light sources are used.

A light apparatus includes a plurality of lamp unit sections, a synthetic mirror section that reflects and synthesizes lights generated by all or some of the plurality of lamp unit sections and, and a synthetic mirror section adjusting mechanism that holds the synthetic mirror section so that its position can be changed so as to adjust the reflecting optical paths of the reflected lights.

6 Claims, 13 Drawing Sheets

U.S. PATENT DOCUMENTS

| | | | |
|---|---|---|---|
| 5,669,686 A * | 9/1997 | Moon | 353/98 |
| 5,743,612 A * | 4/1998 | Matsuda et al. | 353/97 |
| 6,224,217 B1 | 5/2001 | Tanaka | |
| 6,317,246 B1 * | 11/2001 | Hayashi et al. | 359/204 |
| 6,323,889 B1 * | 11/2001 | Miura | 347/234 |

FOREIGN PATENT DOCUMENTS

| | | |
|---|---|---|
| JP | 10-90645 | 4/1998 |
| JP | 2000-171901 | 6/2000 |
| JP | 2000-194067 | 7/2000 |
| JP | 2001-228533 | 8/2001 |
| JP | 2002-72083 | 3/2002 |

\* cited by examiner

LIGHTING APPARATUS

This Application is a U.S. National Phase Application of PCT International Application PCT/JP03/12759.

TECHNICAL FIELD

The present invention relates to, for example, a lighting apparatus that projects a large screen video on a screen and method thereof.

BACKGROUND ART

In recent years, much attention has been paid to a projection type display apparatus (projector) using a plurality of light sources, as projection type video equipment capable of large screen display (refer to, for example, Japanese Patent Laid-Open No. 2000-171901).

The entire disclosure of Japanese Patent Laid-Open No. 2001-171901 is incorporated herein by reference in its entirety.

These projection type display apparatuses (1) light a light modulating element (a transmission or reflection type liquid crystal or a DMD (Digital Micromirror Device) that can change a reflection direction using micromirrors arranged in an array) capable of light modulation, utilizing light radiated by a light source, (2) form an optical image on the light modulating element in accordance with an externally supplied video signal, and (3) use a projection lens to enlarge and project the optical image on a screen, the image being illumination light modulated by the light modulating element.

(A) An important optical characteristic of enlarged projective display on a large screen is the uniformity of brightness within the display screen.

For the uniformity of brightness within a display area, it is important that the light modulating element is irradiated with light generated by a lamp as a luminous flux that has a relatively uniform brightness in a central and peripheral portions of the area. That is, it is important that the brightness of a luminous flux is uniform.

FIGS. 10 and 11 show a conventional lighting apparatus using a plurality of light sources and implementing a projection type display apparatus using a transmission type liquid crystal panel as a light modulating element and a projection lens.

FIG. 10 shows an optical system using lens arrays 122 and 123 in which a plurality of lenses are two-dimensionally arranged, as an optical element called an integrator and enabling uniform lighting. Furthermore, FIG. 11 shows an optical system using a square-pole-like glass rod 125 as an integrator.

Light emitted by lamps 151 and 161 of these lighting apparatuses (see FIGS. 10 and 11) is (1) collected by ellipsoidal mirrors (concave mirrors) 152 and 162, (2) emitted through openings in the ellipsoidal mirrors 152 and 162, and (3) reflected by a triangle-pole-like prism 131 of a synthesis mirror section 130 that reflects a plurality of luminous fluxes in a predetermined direction, the prism 131 having reflective-coated sides.

The flux reflected by the prism 131 has a nonuniform brightness and has a large difference in luminance between the vicinity of the center and the peripheral portion of the luminous flux.

Thus, in order to make uniform the luminance on the area to be lighted, the luminous flux reflected by the prism 131 is split into partial fluxes. Then, the partial fluxes are superimposed on the area to be lighted to improve the uniformity of the illumination light.

If the lens arrays 122 and 123, in which a plurality of lenses are two-dimensionally arranged, are used (see FIG. 10), a luminous flux incident on a lighting unit section 120 is made almost parallel with the optical axis of the lighting unit section 120 by a relay lens 121. The fluxes are then split into partial fluxes by the lens array 122, in which a plurality of first lenses are two-dimensionally arranged. Then, owing to the lens array 123, which has lenses corresponding to the individual lenses in the lens array 122, the partial fluxes then form images similar to respective lens openings in the lens array 122 and are then superimposed on an area of a light receiving section 110 which is to be lighted.

The luminous flux having nonuniform brightness when entering the lens array 122 is split into the partial fluxes having different luminance distributions. The partial fluxes are then superimposed. In this manner, lighting is achieved which has improved uniformity within the area to be lighted.

If the square-pole-like glass rod 125 is used (see FIG. 11), a luminous flux incident on the lighting unit section 120 enters a facet of the glass rod 125. The light entering the interior of the glass rod 125 is emitted from a facet of the glass rod 125 which is opposite its entry facet while being transmitted through the glass rod 125 or being totally reflected. At this time, the light emitted from the exit facet is totally reflected inside the glass rod 125 a number of times corresponding to the angle at which the light has been incident on the glass rod 125. Accordingly, the partial fluxes are emitted from one opening, the exit facet of the glass rod 125, at different angles. The partial fluxes are superimposed by a relay lens 124 on the area of light receiving section 110 which is to be lighted.

The luminous flux having nonuniform brightness when entering the glass rod 125 is split into the partial fluxes having different luminance distributions. The partial fluxes are then superimposed. In this manner, lighting is achieved which has improved uniformity within the area to be lighted.

Thus, a projection type display apparatus using the lighting apparatus (see FIGS. 10 and 11) can display a video with a highly uniform brightness by enlarging an image formed by a liquid crystal panel (not shown) arranged on a lighted surface as a light modulating element, on a screen (not shown) via a projection lens (not shown)

(B) FIG. 12 shows a lighting apparatus system configured similarly to the above lighting apparatuses and using nine lighting apparatuses 300 to project light from behind a transmission type multiscreen 500 so that the multiscreen 500 can form one integrated video on a screen.

By utilizing the lighting apparatus system (see FIG. 12) that displays one integrated video using the plurality of lighting apparatuses 300, it is possible to display videos of higher resolutions or simultaneously display many pieces of information.

(A) The inventors have found that with an optical system using a plurality of light sources as described above, not all the plural light sources may be simultaneously used and some of the plural light sources may be used in accordance with a user's manual operation.

More specifically, high-pressure mercury lamps that are light sources often used in lighting apparatuses have a lifetime of about 2,000 to 5,000 hours, which is relatively shorter than that of a set, which is about 5 to 10 years. Thus, if no particular requests have been made for the brightness in the display screen or the time remaining before the lamps must be replaced is to be maximized, some of the plural light sources are often used.

Furthermore, if a plurality of light sources are used but trouble occurs such as the sudden breakage of any lamp or a failure to light any lamp, some of the plural light sources are used.

However, in an optical system using a plurality of light sources, the devices are designed so as to provide uniform lighting assuming the usage of all the light sources. In short, with an optical system using a plurality of light sources, the uniformity of the brightness in the display screen may be degraded if not all the plural light sources are used.

(B) The inventors have also found that with a lighting apparatus system that displays one integrated video using a plurality of lighting apparatuses, the brightness may vary in a wavy form within one integrated video as shown in FIG. 13.

More specifically, the 3×3 multiscreen 500 has the brightest part in a central portion of a small screen corresponding to each lighting apparatus and the darkest part in a peripheral portion of the small screen. Accordingly, in one integrated video, (1) the brightness distribution in the direction of a vertical axis is shaped like mountains having three peaks as shown in a graph 601, while (2) the brightness distribution in the direction of a horizontal axis is shaped like mountains having three peaks as shown in a graph 602.

However, such a variation in brightness in a wavy form within one integrated video may result in an esthetically unfavorable impression on many users. In short, a lighting apparatus system that displays one integrated video using a plurality of lighting apparatuses may have a degraded display grade.

DISCLOSURE OF THE INVENTION

In view of the above conventional problems, it is an object of the present invention to provide a lighting apparatus that can improve the display quality of projective display.

A first aspect of the present invention is a lighting apparatus comprising:

a plurality of light sources generating light;

light reflecting and synthesizing means of reflecting and synthesizing lights generated by all or some of said plurality of light sources; and light reflecting and synthesizing means holding means of holding said light reflecting and synthesizing means so that a position of said light reflecting and synthesizing means can be changed so as to adjust reflecting optical paths of said reflected lights.

A second aspect of the present invention is the lighting apparatus according to the first aspect of the present invention, further comprising light superimposing means of superimposing said reflected lights on each other, and light intensity distribution measuring means of measuring intensity distribution of said superimposed light, wherein said adjustment is carried out on the basis of a result of said measurement.

A third aspect of the present invention is the lighting apparatus according to the first aspect of the present invention, further comprising light rotating means of rotating said reflected lights.

A fourth aspect of the present invention is the lighting apparatus according to the first aspect of the present invention, wherein said light reflecting and synthesizing means is constructed utilizing a prism or a mirror.

A fifth aspect of the present invention is the lighting apparatus according to the second aspect of the present invention, wherein said light superimposing means is constructed utilizing a lens array or a glass rod.

A sixth aspect of the present invention is a lighting apparatus system comprising a plurality of lighting apparatuses according to the first aspect of the present invention, wherein the position of said light reflecting and synthesizing means of each of the lighting apparatuses is changed so as to meet a predetermined relationship.

A seventh aspect of the present invention is a lighting method comprising:

a light reflecting and synthesizing means holding step of holding light reflecting and synthesizing means of reflecting and synthesizing lights generated by all or some of a plurality of light sources so that a position of said light reflecting and synthesizing means can be changed so as to adjust reflecting optical paths of said reflected lights; and a reflecting optical path adjusting step of adjusting the reflecting optical paths of said reflected lights.

An eighth aspect of the present invention is a lighting method according to the seventh aspect of the present invention, further comprising a light superimposing step of superimposing said reflected lights on each other, and a light intensity distribution measuring step of measuring intensity distribution of said superimposed lights, wherein said adjustment is carried out on the basis of a result of said measurement.

A ninth aspect of the present invention is a program allowing a computer to execute the reflecting optical path adjusting step of the lighting method according to the seventh aspect of the present invention.

A tenth aspect of the present invention is a recording medium carrying the program according to the ninth aspect of the present invention wherein the recording medium can be processed by a computer.

DESCRIPTION OF SYMBOLS

Figure 1:
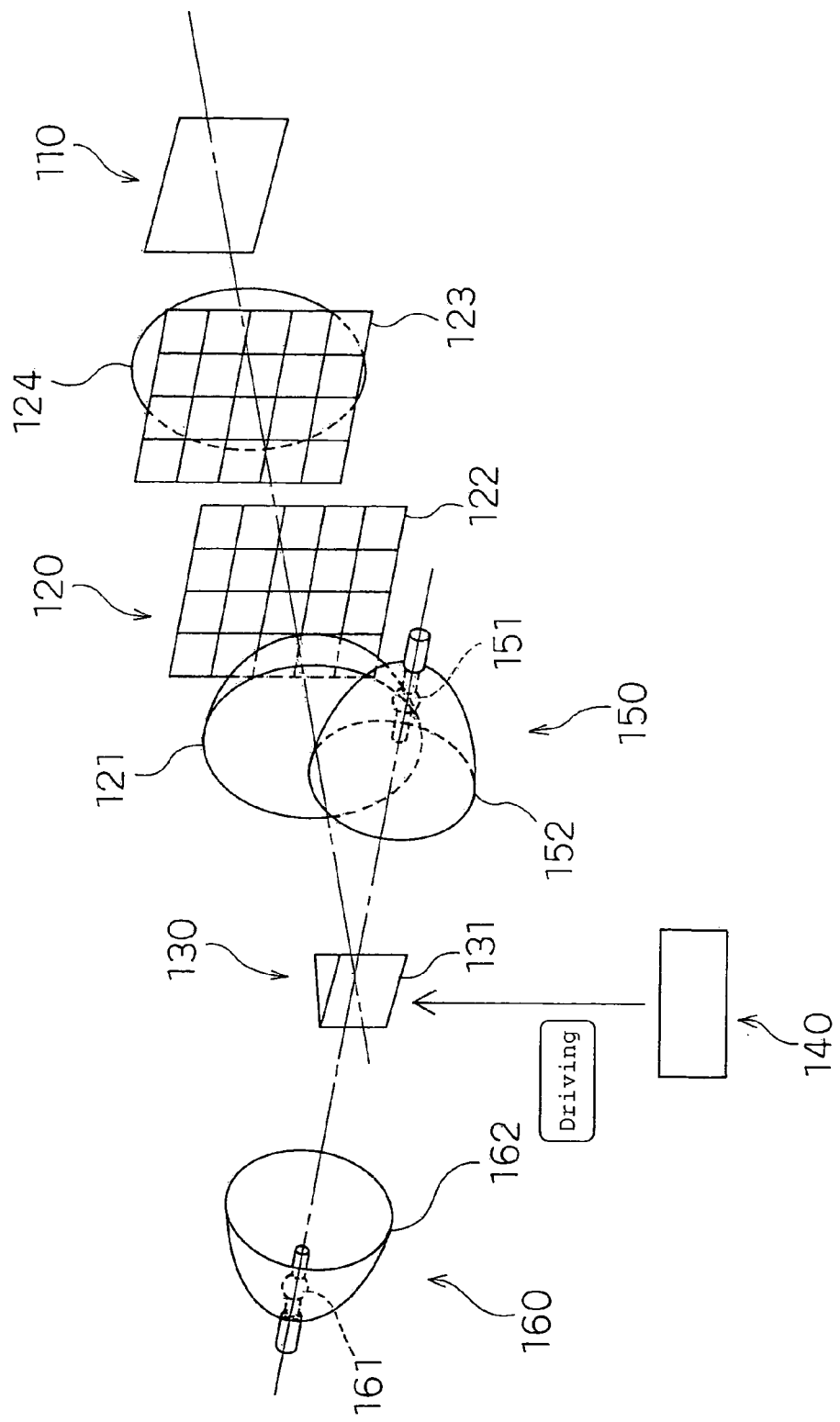
FIG. 1 is a schematic diagram showing the configuration of a lighting apparatus of Embodiment 1 according to the present invention.

110 Light receiving section
120 Lighting unit section
121 Relay lens
122 Lens array
123 Lens array
124 Relay lens
130 Synthetic mirror section
131 Prism
140 Synthetic mirror section adjusting mechanism
150 Lamp unit section
151 Lamp
152 Ellipsoidal mirror
160 Lamp unit section
161 Lamp
162 Ellipsoidal mirror

BEST MODE FOR CARRYING OUT THE INVENTION

Embodiments according to the present invention will be described below with reference to the drawings.

(Embodiment 1)

First, with reference to FIG. 1 that is a schematic diagram showing the configuration of a lighting apparatus of Embodiment 1 according to the present invention, description will be given of the configuration of the lighting apparatus of the present embodiment.

The lighting apparatus of the present embodiment comprises lamp unit sections 150 and 160, a synthetic mirror section adjusting mechanism 140, a synthetic mirror section 130, a lighting unit section 120, and a light receiving section 110.

The lighting apparatus of the present embodiment is characterized by comprising a synthetic mirror section adjusting mechanism 140.

Now, a further detailed description will be given of the configuration of the lighting apparatus of the present embodiment.

The lamp unit section 150 is means having an ultrahigh-pressure mercury lamp 151 having a glass tube in which an inert gas or the like is sealed in order to form an illuminant by arc discharge, and an ellipsoidal mirror 152. A light emitting section of the lamp 151 is arranged at a first focus of the ellipsoidal mirror 152.

The lamp unit section 160 is means configured similarly to the lamp unit section 150 and having a lamp 161 and an ellipsoidal mirror 162. A light emitting section of the lamp 161 is arranged at a first focus of the ellipsoidal mirror 162.

The lamp unit sections 150 and 160 are light sources that are normally lighted at all times. The lamp unit sections 150 and 160 are arranged so that (1) the optical axis of the lamp unit section 150 coincides with the optical axis of the lamp unit section 160, that (2) the optical axis of the lamp unit section 150 (that is, the optical axis of the lamp unit section 160) is generally orthogonal to the optical axis of the lighting unit section 120, and that (3) a second focus of the ellipsoidal mirror 152 and a second focus of the ellipsoidal mirror 162 substantially coincide with a reflection surface of the prism 131. The optical axes are shown with alternate long and short dash lines, with the illustration of the foci omitted.

The synthetic mirror section 130 is means having a triangular-pole-like prism 131 having sides acting as mirror surfaces that reflect luminous fluxes emitted by the lamp unit sections 150 and 160, toward the lighting unit section 120, the sides being coated with a reflection film such as a metal reflection film or a dielectric multilayer film.

The sides of the prism 131 are arranged near the second focus of the ellipsoidal mirror 152 (that is, near the second focus of the ellipsoidal mirror 162).

The synthetic mirror section adjusting mechanism 140 is means of moving and adjusting the position of the synthetic mirror section 130 so that a bottom surface of the prism 131 is kept parallel with a plane containing the optical axis of the lamp unit section 150 and the optical axis of the lighting unit section 120, the two optical axes being orthogonal to each other.

The movement of the synthetic mirror section 130 is the synthesis of parallel movement parallel with the plane containing the optical axis of the lamp unit section 150 and the optical axis of the lighting unit section 120 and rotative movement with respect to the normal of the plane containing the optical axis of the lamp unit section 150 and the optical axis of the lighting unit section 120.

A further detailed description will be given of the roles of the synthetic mirror section adjusting mechanism 140 that is a characteristic component of the lighting apparatus of the present embodiment.

The lighting unit section 120 is means having relay lenses 121 and 124 that enable the shaping and homogenization of a luminous flux on the basis of a lighted area, and lens arrays 122 and 123 acting as integrators to enable highly uniform lighting.

The lens array 122 has a plurality of two-dimensionally arranged first lenses. The lens array 123 has a plurality of two-dimensionally arranged second lenses corresponding to the individual first lenses in the lens array 122.

The lamp unit sections 150 and 160 correspond to light sources of the present invention. The synthetic mirror section 130 corresponds to light reflecting and synthesizing means of the present invention. The synthetic mirror section adjusting mechanism 140 corresponds to light reflecting and synthesizing means holding means of the present invention. The lighting unit section 120 corresponds to light superimposing means of the present invention. The lighting apparatus of the present embodiment corresponds to a lighting apparatus of the present invention.

Now, with reference to mainly FIG. 1, description will be given to operations of the lighting apparatus of the present embodiment.

While describing operations of the lighting apparatus of the present embodiment, description will be given of an embodiment of a lighting method of the present invention.

The synthetic mirror section adjusting mechanism 140 adjusts the position of the synthetic mirror section 130 to a neutral one (where uniform lighting can be provided assuming that both lamps 151 and 161 are used and which is shown utilizing dot lines in FIG. 2, described later) so that a symmetrical surface of the prism 131 (a symmetrical surface perpendicular to the bottom surface) is generally orthogonal to the optical axes of the lamp unit sections 150 and 160 and contains the optical axis of the lighting unit section 120.

The lamp 151 emits light generated by arc discharge, from the vicinity of the first focus of the ellipsoidal mirror 152. The ellipsoidal mirror 152 condenses light emitted from the vicinity of the first focus of the ellipsoidal mirror 152 to form a small light spot on a side of the prism 131 and near the second focus of the ellipsoidal mirror 152, the side being is closer to the lamp unit section 150. The prism 131 reflects the light formed as the small spot near the second focus of the ellipsoidal mirror 152 by the condensation, from the light spot along the optical axis of the lighting unit section 120.

Similarly, the lamp 161 emits light generated by arc discharge, from the vicinity of the first focus of the ellipsoidal mirror 162. The ellipsoidal mirror 162 condenses light emitted from the vicinity of the first focus of the ellipsoidal mirror 162 to form a small light spot on a side of the prism 131 and near the second focus of the ellipsoidal mirror 162, the side being is closer to the lamp unit section 160. The prism 131 reflects the light formed as the small spot near the second focus of the ellipsoidal mirror 162 by the condensation, from the light spot along the optical axis of the lighting unit section 120.

The relay lens 121 converts the light reflected along the optical axis of the lighting unit section 120, into a luminous flux generally parallel with the optical axis of the lighting unit section 120 so that the flux does not spread outward.

The lens array 122 utilizes the plurality of first lenses to split the luminous flux generally parallel with the optical axis of the lighting unit section 120, into partial fluxes.

The lens array 123 utilizes the plurality of second lenses and the relay lens 124 to form the split partial fluxes into images similar to respective lens openings of the lens array 122. The images are superimposed on one another on the light receiving section 110.

Thus, the luminous flux having nonuniform brightness is split into partial fluxes having various luminance distributions. The split partial fluxes are then superimposed on one another to provide uniform lighting within the area to be lighted.

Now, a detailed description will be given of the roles of the synthetic mirror section adjusting mechanism 140, which is a characteristic component of the lighting apparatus of the present embodiment.

(A) The lamps 151 and 161 are not simultaneously used if no particular requests have been made for the brightness in the display screen, the time remaining before the lamps must be replaced is to be maximized, or trouble occurs such as the sudden breakage of any lamp or a failure to light any lamp, as described previously.

On this occasion, the synthetic mirror section adjusting mechanism 140 moves the synthetic mirror section 130 to adjust its position.

Figure 2:
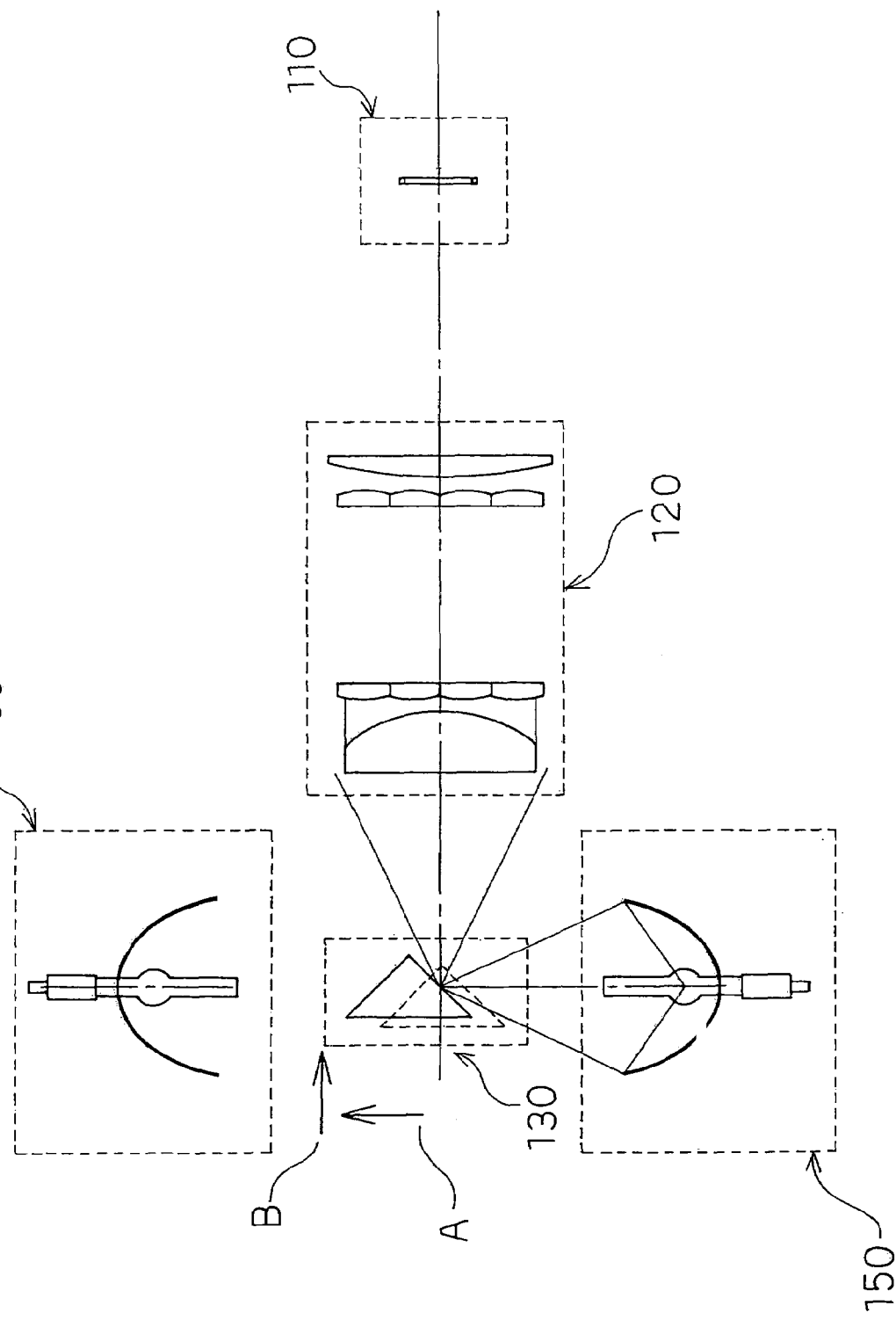
FIG. 2 is a schematic plan view illustrating directions adjusted by a synthetic mirror section adjusting mechanism of Embodiment 1 according to the present invention.

More specifically, as shown in FIG. 2 that is a schematic plan view illustrating directions adjusted by the synthetic mirror section adjusting mechanism 140 of Embodiment 1 according to the present invention, when only the lamp 151 is used and the lamp 161 is not used, the synthetic mirror section adjusting mechanism 140 (not shown in FIG. 2) shifts the synthetic mirror section 130 from the previously described neutral position (1) toward the lamp unit section 160 along the optical axis of the lamp unit section 150, shown by arrow A. The synthetic mirror section adjusting mechanism 140 also shifts the synthetic mirror section 130 from the previously described neutral position (2) toward the lighting unit section 120 along the optical axis of the lighting unit section 120, shown by arrow B.

Since the position of the synthetic mirror section 130 is thus adjusted, the relay lens 121 can convert light from the lamp 151 reflected by the prism 131 along the optical axis of the lighting unit section 120, into a luminous flux parallel with the optical axis of the lighting unit section 120.

Thus, even if only the lamp 151 is used, highly uniform lighting can be provided.

(B) In an actual optical system (in particular, an optical system using an arc lamp or the like), a light emitting section in the glass tube sphere is deformed upward into an arch owing to the convection of the inert gas sealed in the glass tube sphere. This often prevents the formation of a brightness distribution rotationally symmetric with respect to the optical axis.

Essentially, the respective lamps provide different outputs. It is thus unavoidable to undergo an error in the arrangement of the optical elements, form tolerance, or a variation in the reflectivity or transmittance within the surface of any mirror or lens. Accordingly, even if the devices are produced exactly as designed, perfectly uniform lighting (that is, such lighting as provides a lighted area having only a small difference in luminance between its central portion and peripheral portion and having a luminance distribution rotationally symmetric with respect to the optical axis) is rarely provided.

The previously described adjustment of the position of the synthetic mirror section 130 executed by the synthetic mirror section adjusting mechanism 140 is also effective in eliminating the nonuniformity of the luminance distribution within the lighted area.

(C) Furthermore, even if the lamps 151 and 161 provide different lamp outputs, the centers of the luminance distributions of the lamps 151 and 161 are commonly present in the plane containing the optical axis of the lamp unit section 150 and the optical axis of the lighting unit section 120. Thus, by moving the synthetic mirror section 130 so that the bottom surface of the prism 131 is kept parallel with the plane containing the optical axis of the lamp unit section 150 and the optical axis of the lighting unit section 120, it is possible to appropriately adjust the luminance distributions of the lamps 151 and 161 to considerably improve the uniformity of lighting (in particular, the uniformity in the direction of the optical axis of the lamp unit section 150).

Embodiment 1 has been described in detail.

(1) In the abode described present embodiment, a change in the position of the light reflecting and synthesizing means of the present invention is such movement of the synthetic mirror section 130 as keeps the bottom surface of the prism 131 parallel with the plane containing the optical axis of the lamp unit section 150 and the optical axis of the lighting unit section 120.

However, the present invention is not limited to this aspect. A change in the position of the light reflecting and synthesizing means of the present invention may be such movement of the synthetic mirror section 130 as inclines the bottom surface of the prism 131 relative to the plane containing the optical axis of the lamp unit section 150 and the optical axis of the lighting unit section 120.

More specifically, such movement of the synthetic mirror section 130 may be rotative movement around the optical axis of the lamp unit section 150. Such rotative movement enables the appropriate adjustment of the luminance distributions of the lamps 151 and 161 even if the lamps 151 and 161 have different heights from the plane containing the optical axis of the lamp unit section 150 and the optical axis of the lighting unit section 120. This serves to improve the uniformity of lighting (in particular, the uniformity in the normal direction of the plane containing the optical axis of the lamp unit section 150 and the optical axis of the lighting unit section 120).

Of course, a change in the position of the light reflecting and synthesizing means of the present invention may be a combination of (a) such movement of the synthetic mirror section 130 as keeps the bottom surface of the prism 131 parallel with the plane containing the optical axis of the lamp unit section 150 and the optical axis of the lighting unit section 120 and (b) such movement of the synthetic mirror section 130 as inclines the bottom surface of the prism 131 relative to the plane containing the optical axis of the lamp unit section 150 and the optical axis of the lighting unit section 120, as described above.

Figure 3:
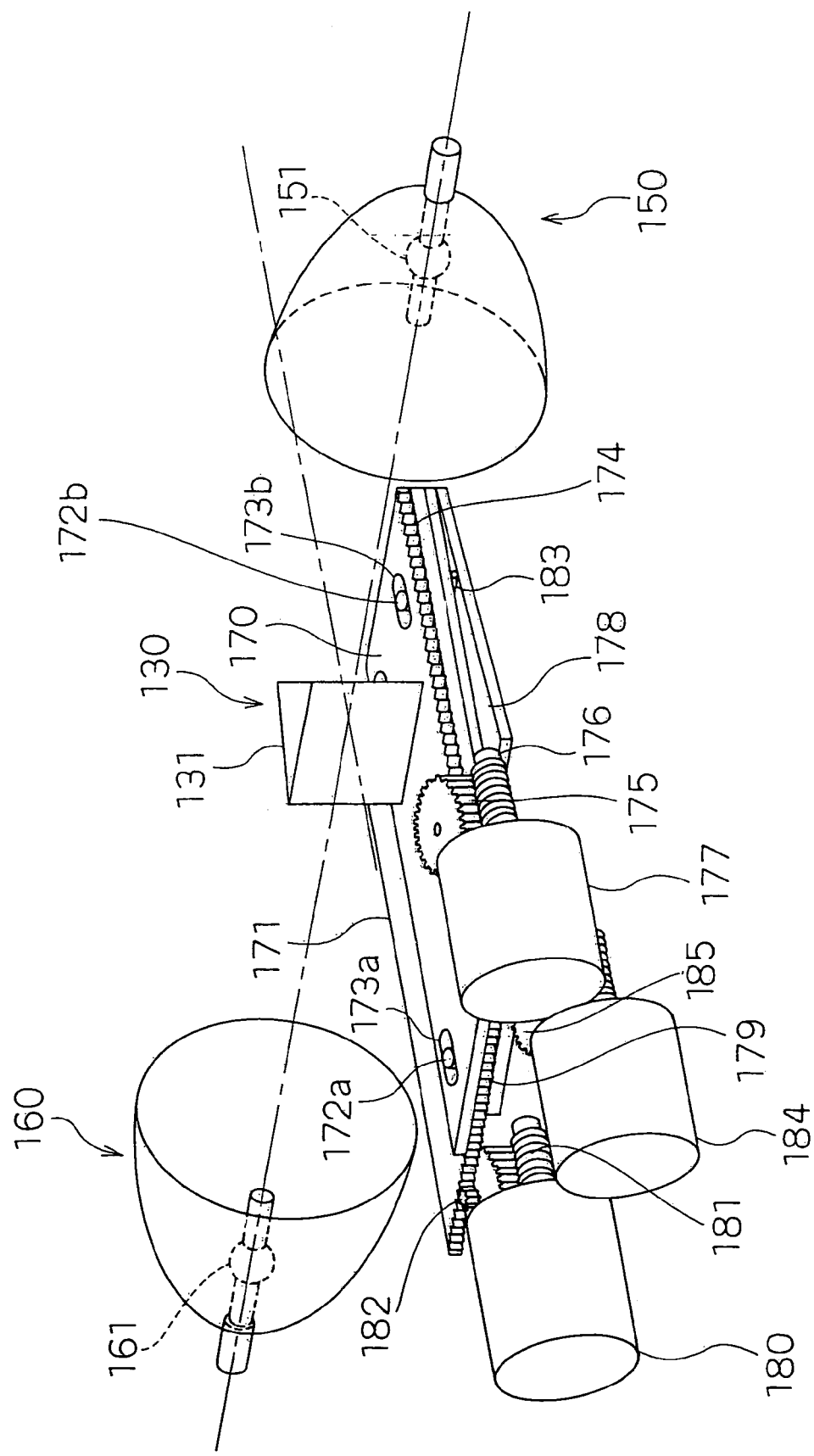
FIG. 3 is a schematic diagram showing the configuration of the synthetic mirror section adjusting mechanism of the lighting apparatus of one embodiment according to the present invention.

Now, an example of a specific configuration and operation of the synthetic mirror section adjusting mechanism will be described with reference to FIG. 3 that is a schematic diagram showing the configuration of the synthetic mirror section adjusting mechanism of the lighting apparatus of one embodiment according to the present invention.

The synthetic mirror section 130 is fixed to a first moving substrate 170. The first moving substrate 170 is arranged on a second moving substrate 171.

Projections 172a and 172b provided on the second moving substrate 171 are fitted into slots 173a and 173b formed in the first moving substrate 170.

The first moving substrate 170 is moved in the direction orthogonal to the direction of the optical axis of the lamp unit section 150 by a motor 177 by driving a reduction gear 175 composed of an integrated small and large gears meshing with a toothed portion 174 formed on a side of the first moving substrate 170 as well as a worm gear 176 meshing with the reduction gear 175.

More specifically, when the reduction gear 175 is rotated by rotative driving in one direction carried out by the motor 177, the first moving substrate 170 moves leftward on the second moving substrate 171. On the other hand, when the reduction gear 175 is rotated by rotative driving in the other direction carried out by the motor 177, the first moving substrate 170 moves rightward on the second moving substrate 171.

Thus, the first moving substrate 170 can be moved on the second moving substrate 171 in the direction orthogonal to the direction of the optical axis of the lamp unit section 150.

Furthermore, the second moving substrate 171 is placed on a third moving substrate 186.

The first moving substrate 170 is moved along the optical axis of the lamp unit section 150 by a motor 180 by driving a reduction gear 182 composed of an integrated small and large gears meshing with a toothed portion 179 formed on an end surface of the second moving substrate 171 as well as a worm gear 181 meshing with the reduction gear 182.

More specifically, when the reduction gear 182 is rotated by rotative driving in one direction carried out by the motor 180, the first moving substrate 170 moves on a fixed substrate 178 away from the lamp unit section 150 together with the second moving substrate 171. On the other hand, when the reduction gear 182 is rotated by rotative driving in the other direction carried out by the motor 180, the first moving substrate 170 moves on the fixed substrate 178 toward the lamp unit section 150 together with the second moving substrate 171.

Thus, the first moving substrate 170 can be moved on the second moving substrate 171 along the optical axis of the lamp unit section 150.

The second moving substrate 171 is supported so as to be rotatable around a support shaft 183 provided parallel with the optical axis of the lamp unit section 150.

A pin (not shown) moved upward and downward via a reduction mechanism 185 by rotative driving by a motor 184 is abutted against the third moving substrate 186 through a hole (not shown) formed below the fixed substrate 178.

Thus, the first moving substrate 170 can be rotated around the support shaft 183 together with the second moving substrate 171 and the third moving substrate 186.

As is apparent from the above description, the synthetic mirror section adjusting mechanism can spatially continuously move the prism 131 of the synthetic mirror section 130.

(2) In the above described present embodiment, the light source of the present invention has the ultrahigh-pressure mercury lamps 151 and 161. However, the present invention is not limited to this aspect. The light source of the present invention may have a high-pressure mercury lamp, or a metal halide lamp, a xenon lamp, a halogen lamp, or the like which is used as a lamp having a high light emission efficiency.

(3) Furthermore, in the above described present embodiment, the light source of the present invention has the two lamps 151 and 161. However, the present invention is not limited to this aspect. The light source of the present invention may have two or more lamps that are lighted in an arbitrary combination.

Figure 4:
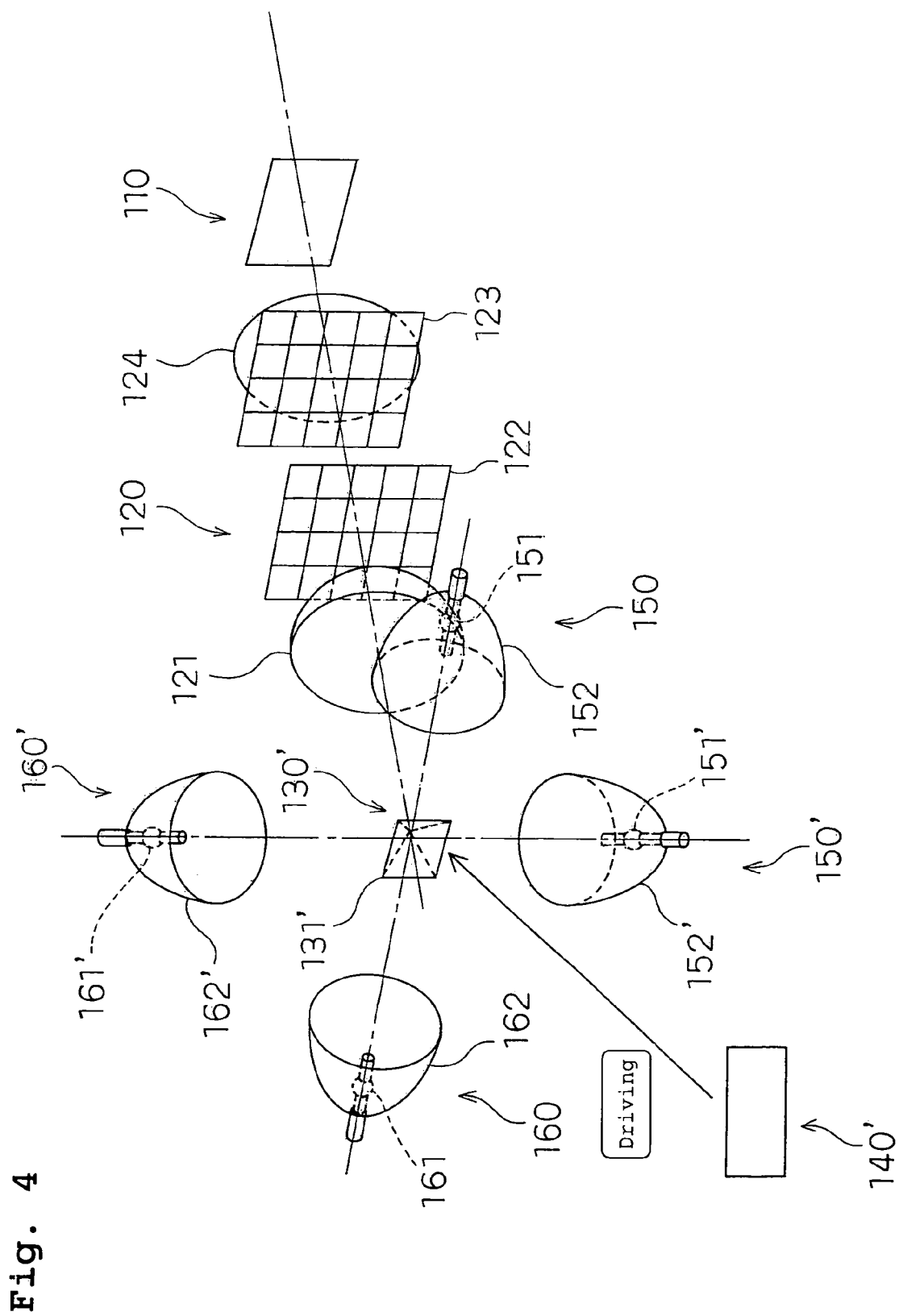
FIG. 4 is a schematic diagram showing the configuration of a lighting apparatus of one embodiment according to the present invention.

More specifically, as shown in FIG. 4 that is a schematic diagram of a lighting apparatus of one embodiment according to the present invention, the present invention includes a lighting apparatus comprising, in addition to the lamps 151 and 161, lamps 151' and 161' that are normally lighted at all times (that is, comprising a total of four lamps 151, 161, 151' and 161').

Such a lighting apparatus comprises the lamp unit sections 150, 160, 150', and 160', a synthetic mirror section adjusting mechanism 140', a synthetic mirror section 130', the lighting unit section 120, and the light receiving section 110.

The lamp unit section 150' is means configured similarly to the lamp unit section 150 and having the lamp 151' and an ellipsoidal mirror 152'. A light emitting section of the lamp 151' is arranged at a first focus of the ellipsoidal mirror 152'.

The lamp unit section 160' is means configured similarly to the lamp unit section 160 and having the lamp 161' and an ellipsoidal mirror 162'. A light emitting section of the lamp 161' is arranged at a first focus of the ellipsoidal mirror 162'.

The lamp unit sections 150' and 160' are arranged so that (1) the optical axis of the lamp unit section 150' coincides with the optical axis of the lamp unit section 160', that (2) the optical axis of the lamp unit section 150' (that is, the optical axis of the lamp unit section 160') is generally orthogonal to the optical axis of the lighting unit section 120, and that (3) a second focus of the ellipsoidal mirror 152' and a second focus of the ellipsoidal mirror 162' substantially coincide with a reflection surface of a prism 131'. The optical axes are shown with alternate long and short dash lines, with the illustration of the foci omitted.

The optical axis of the lamp unit section 150 is generally orthogonal to the optical axis of the lamp unit section 150'.

The synthetic mirror section 130' is means having a quadratic-pyramid-like (pyramidal) prism 131' having sides acting as mirror surfaces that reflect luminous fluxes emitted by the lamp unit sections 150, 160, 150', and 160' toward the lighting unit section 120, the sides being coated with a reflection film.

The sides of the prism 131' are arranged near the second focus of the ellipsoidal mirror 152 (that is, near the second focus of the ellipsoidal mirror 162). The sides of the prism 131' are also arranged near the second focus of the ellipsoidal mirror 152' (that is, near the second focus of the ellipsoidal mirror 162').

The synthetic mirror section adjusting mechanism 140' is means of moving and adjusting the position of the synthetic mirror section 130' so that a bottom surface of the prism 131' is kept parallel with a plane containing the optical axis of the lamp unit section 150 and the optical axis of the lamp unit section 150', the two optical axes being orthogonal to each other.

The movement of the synthetic mirror section 130' is the synthesis of parallel movement parallel with the plane containing the optical axis of the lamp unit section 150 and the optical axis of the lamp unit section 150' and rotative movement with respect to the normal of the plane containing the optical axis of the lamp unit section 150 and the optical axis of the lamp unit section 150'.

The lamp unit sections 150, 160, 150', and 160' correspond to light sources of the present invention. The synthetic mirror section 130' corresponds to light reflecting and synthesizing means of the present invention. The synthetic mirror section adjusting mechanism 140' corresponds to light reflecting and synthesizing means holding means of the present invention.

A specific example of a lighting apparatus comprising four lamps has been described in detail. However, it is possible to implement a lighting apparatus of the present invention comprising three or five or more light sources by configuring the light reflecting and synthesizing means and the light reflecting and synthesizing means holding means of the present invention in accordance with the number of the light sources.

Figure 5:
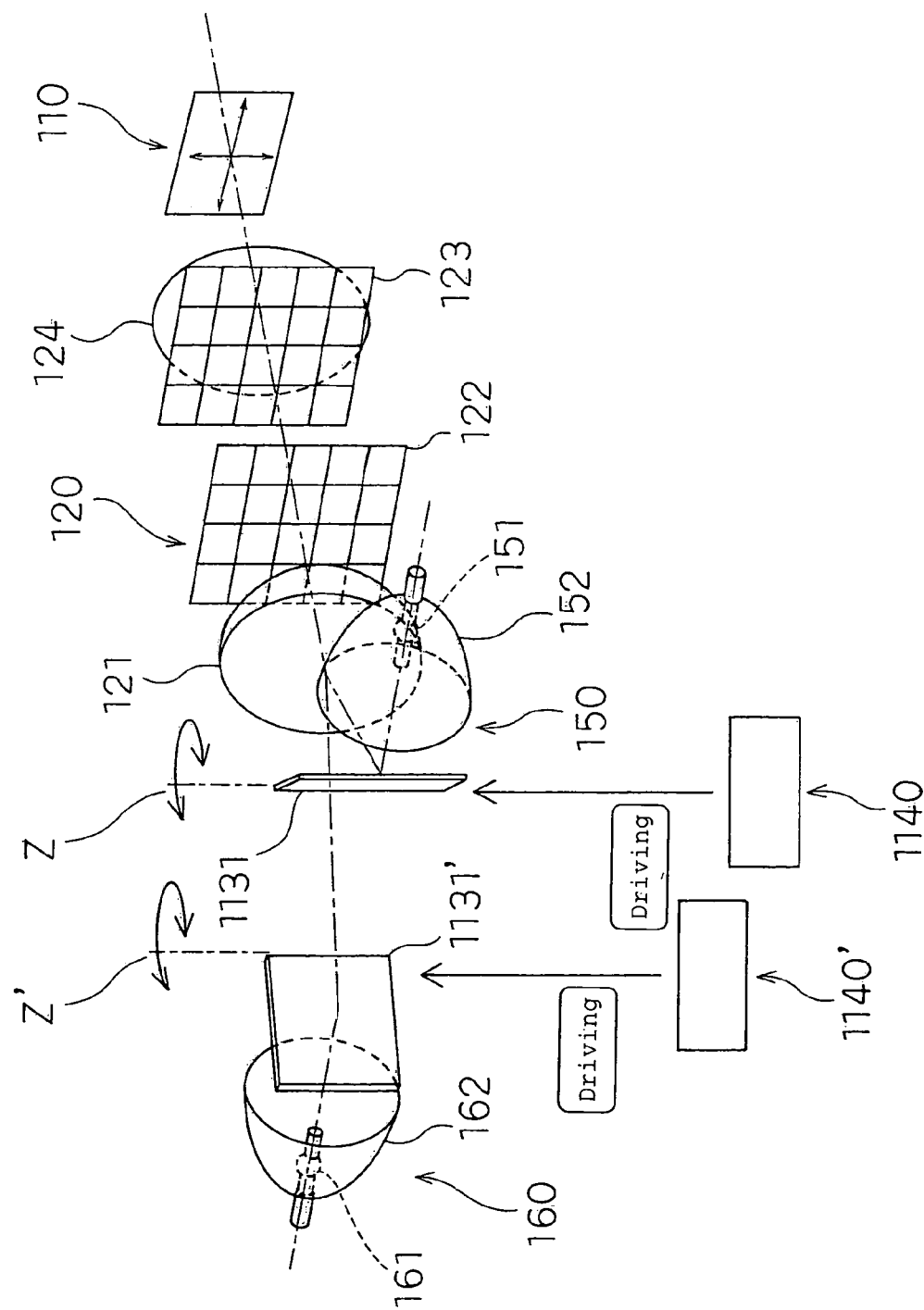
FIG. 5 is a schematic diagram showing the configuration of a lighting apparatus of one embodiment according to the present invention.

(4) In the above described present embodiment, the light reflecting and synthesizing means of the present invention has the prism 131. However, the present invention is not limited to this aspect. The light reflecting and synthesizing means of the present invention may have (1) two mirrors laminated with each other at their edges or (2) two mirrors that are not laminated with each other at their edges (for example, a mirror 1131 rotatively moved by a synthetic mirror section adjusting mechanism 1140 around an axis Z perpendicular to the plane containing the optical axis of the lamp unit section 150 and the optical axis of the lighting unit section 120 and a mirror 1131' rotatively moved by a synthetic mirror section adjusting mechanism 1140' around an axis Z' perpendicular to the plane containing the optical axis of the lamp unit section 160 and the optical axis of the lighting unit section 120, as shown in FIG. 5 that is a schematic diagram showing the configuration of a lighting apparatus of one embodiment according to the present invention).

(5) In the above described present embodiment, the light source of the present invention has the ellipsoidal mirrors 152 and 162. However, the present invention is not limited to this aspect. The light source of the present invention may have parabolic mirrors.

Figure 6:
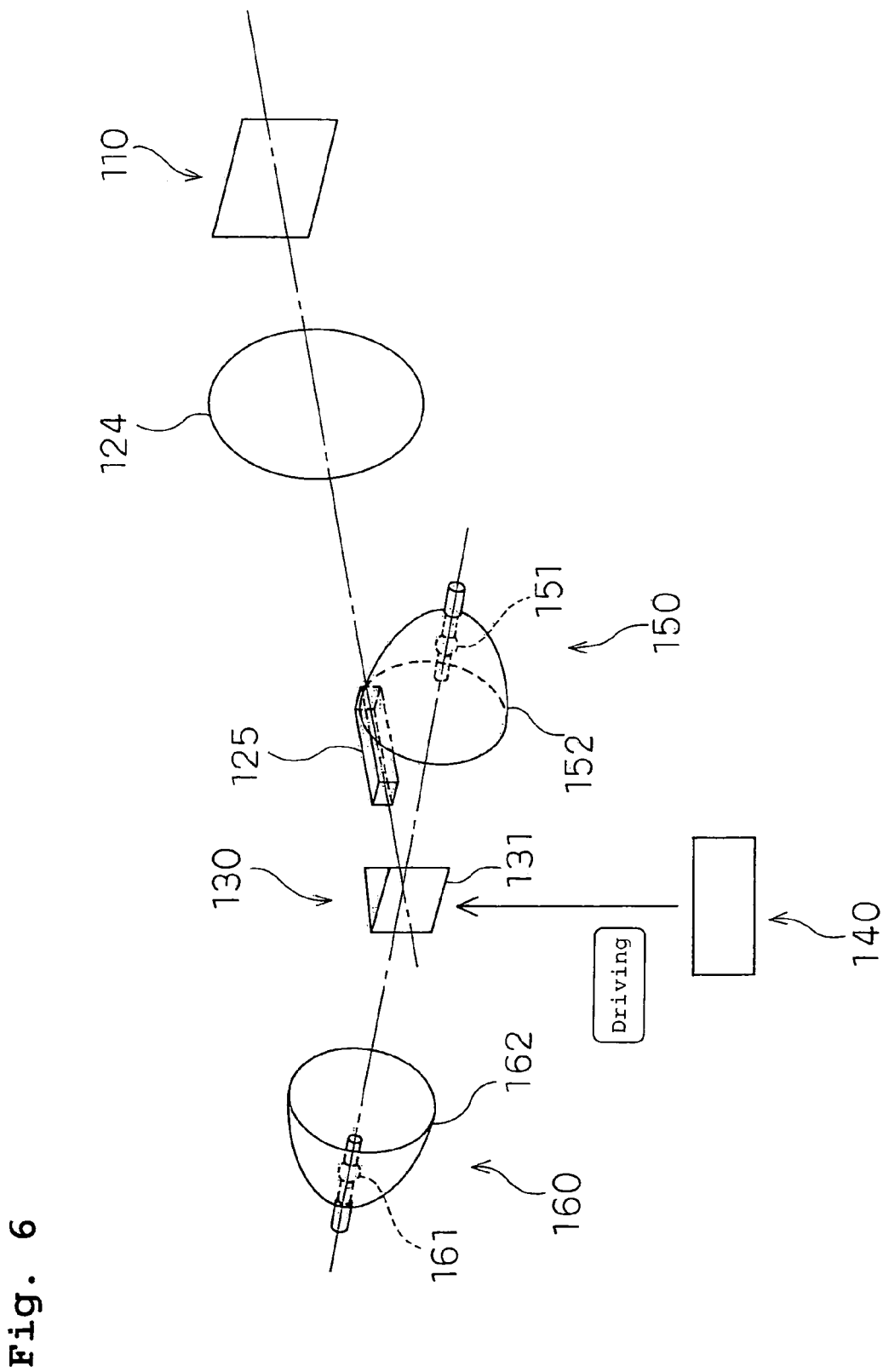
FIG. 6 is a schematic diagram showing the configuration of a lighting apparatus of one embodiment according to the present invention.

(6) Furthermore, in the above described present embodiment, the light superimposing means of the present invention has the lens arrays 122 and 123. However, the present invention is not limited to this aspect. The light superimposing means of the present invention may have the glass rod 125 or the like as shown in FIG. 6 that is a schematic diagram showing the configuration of a lighting apparatus of one embodiment according to the present invention.

(7) Moreover, in the above described present embodiment, the light superimposing means of the present invention has the relay lenses 121 and 124. However, the present invention is not limited to this aspect. The light superimposing means of the present invention may have a mirror or a plurality of combined single lenses or may have no such optical elements (depending on the configuration of the optical system).

(8) Furthermore, the lighting apparatus of the present invention may further comprise light intensity distribution measuring means of measuring the intensity distribution of light superimposed by the light superimposing means. Then, the position of the light reflecting and synthesizing means may be changed on the basis of the result of the measurement.

Figure 7:
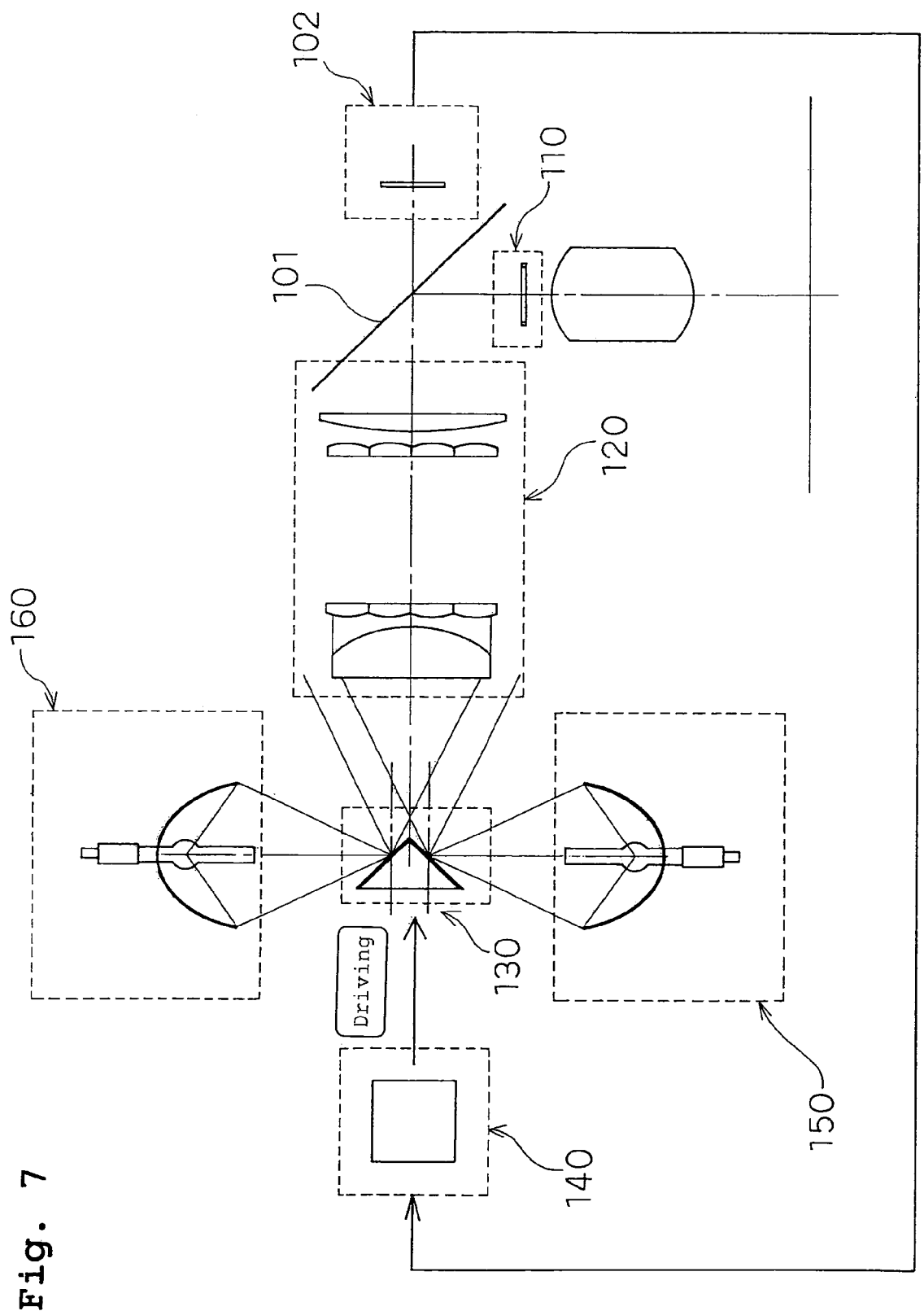
FIG. 7 is a schematic diagram showing the configuration of a lighting apparatus of one embodiment according to the present invention.

More specifically, as shown in FIG. 7 that is a schematic diagram showing the configuration of a lighting apparatus of one embodiment according to the present invention, the lighting apparatus of the present embodiment may comprise light intensity distribution measuring means 102 having a plurality of light sensors two-dimensionally arranged at a position equivalent to that of the light receiving section 110, to measure the quantity of light proportional to the quantity of light in the central and peripheral portions of the light receiving section 110 by using a half mirror 101. Then, the synthetic mirror section adjusting mechanism 140 may utilize an actuator (not shown) to change the position of the synthetic mirror section 130 on time in accordance with the previously described result of the light quantity measurement using automatic adjustment or manual adjustment based on the user's manual operation.

Of course, the intensity distribution of light in the light receiving section 110 may be measured by utilizing means other than the half mirror 101 and the light intensity distribution measuring means 102 instead of utilizing the light intensity distribution measuring means 102 arranged to split the optical path using the half mirror 101.

More specifically, the intensity distribution of light in the light receiving section 110 may be measured as a light intensity distribution near the light receiving section 110 or as a light intensity distribution on the screen in the case where a projection lens (described later) is used to project an image on a light modulating element (described later).

(9) Furthermore, the lighting apparatus of the present invention may further comprise light rotating means of rotating light reflected by the light reflecting and synthesizing means.

(10) Moreover, the lighting apparatus of the present invention may further comprise one or more image display devices (for example, a transmission type liquid crystal panel, a transmission type light bulb, a reflection type light bulb, a mirror panel that can change a reflecting direction using arrayed micromirrors, or a light modulating element based on an optical write method).

Figure 8:
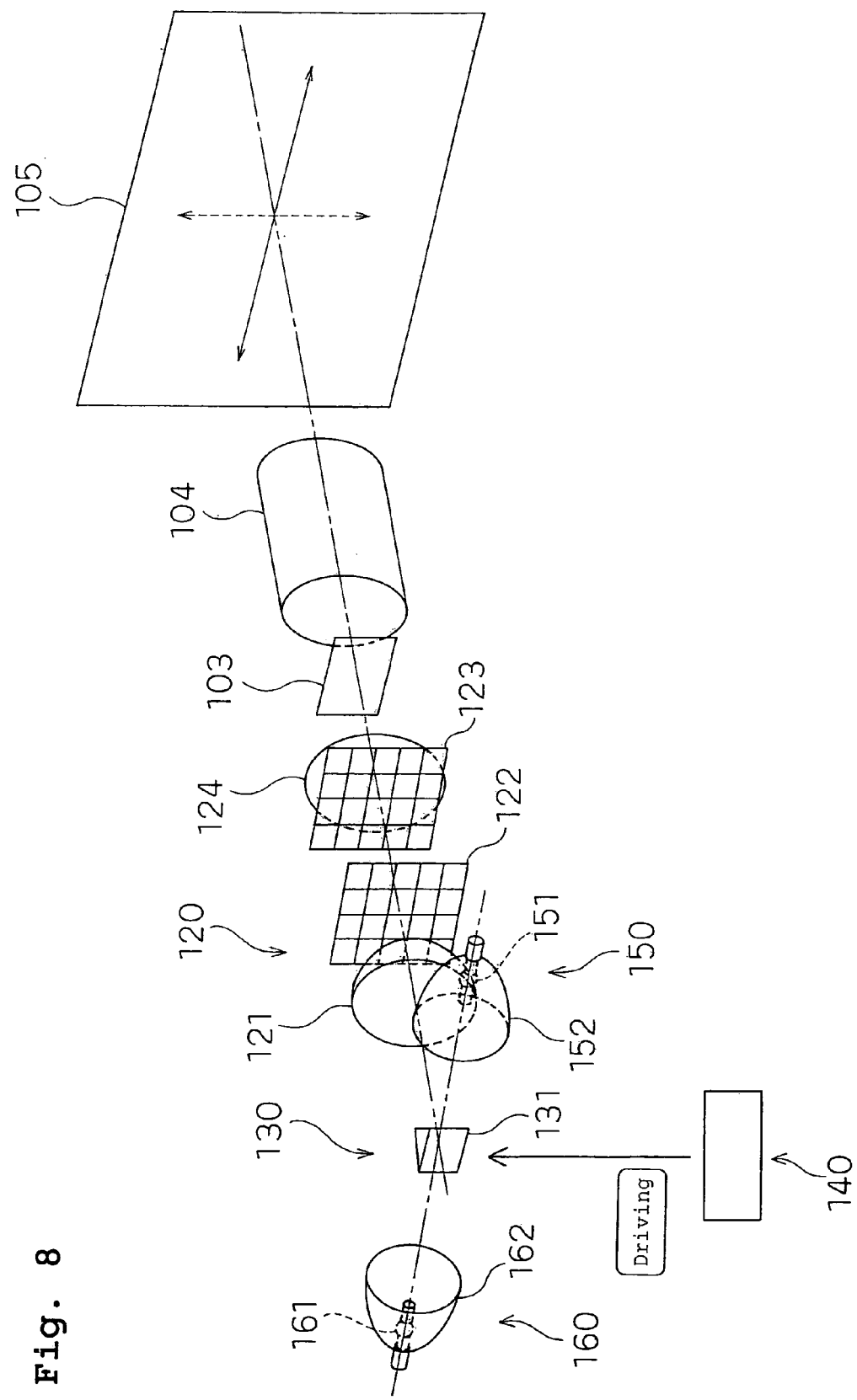
FIG. 8 is a schematic diagram showing the configuration of a lighting apparatus of one embodiment according to the present invention.

More specifically, the lighting apparatus of the present embodiment may comprise a transmission type liquid crystal panel 103 as shown in FIG. 8 that is a schematic diagram showing the configuration of a lighting apparatus of one embodiment according to the present invention.

(11) Furthermore, the lighting apparatus of the present invention may further comprise an optical element (for example, a prism, a filter, or a mirror) for color separation or synthesis.

(12) Moreover, the lighting apparatus of the present invention may further comprise a projection lens that implements projection type display apparatus for projective display.

More specifically, the lighting apparatus of the present embodiment may further comprise a projection lens 104 that provides projective display on a projection surface 105 as shown in FIG. 8.

A lighting apparatus comprising an image display device such as a transmission type liquid crystal panel and a projection lens as described above is often called a projection type display apparatus.

(Embodiment 2)

Figure 9:
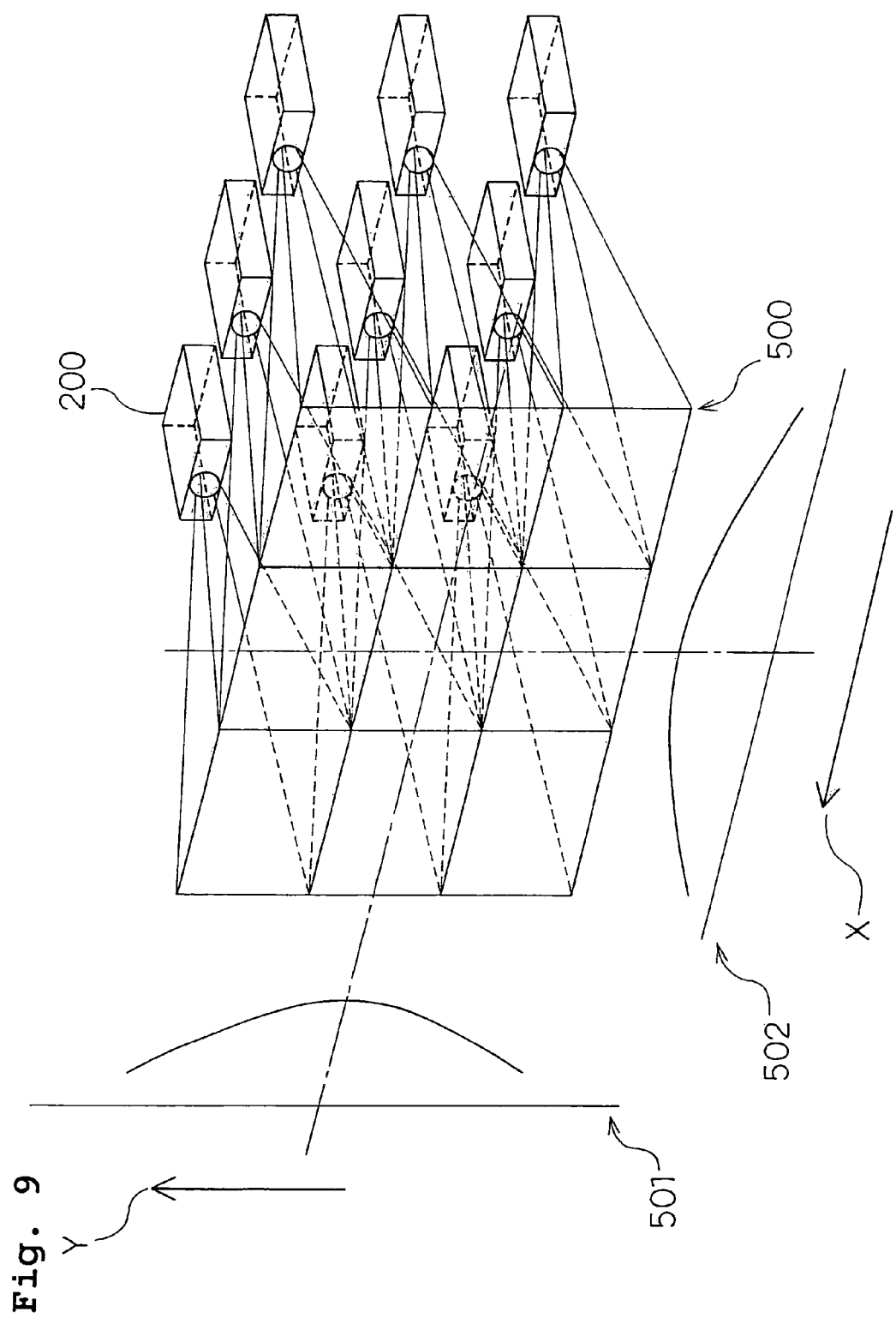
FIG. 9 is a diagram illustrating a projection type display apparatus of Embodiment 2 according to the present invention and projective display provided by the projection type display apparatus.
Figure 10:
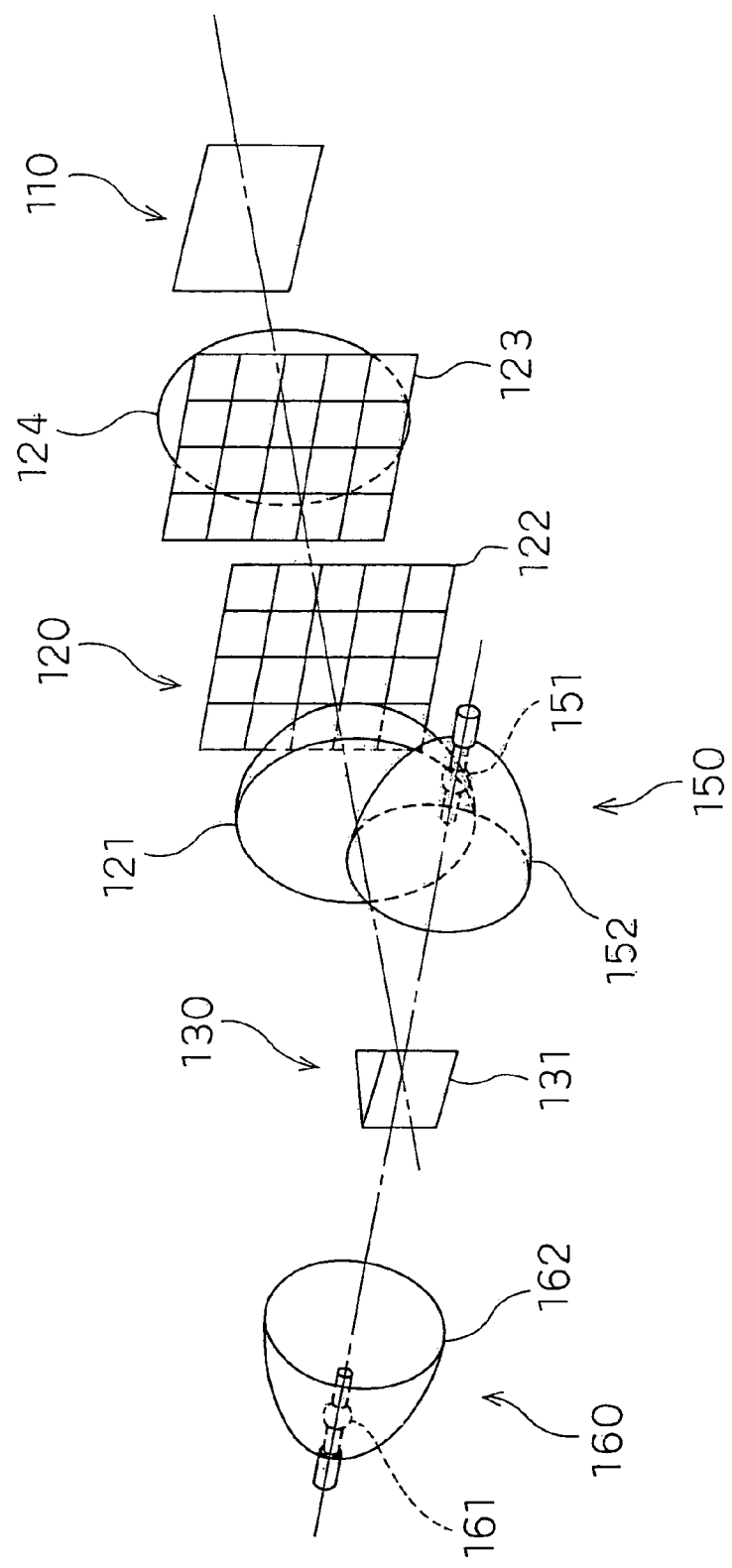
FIG. 10 is a schematic diagram showing the configuration of a conventional lighting apparatus.
Figure 11:
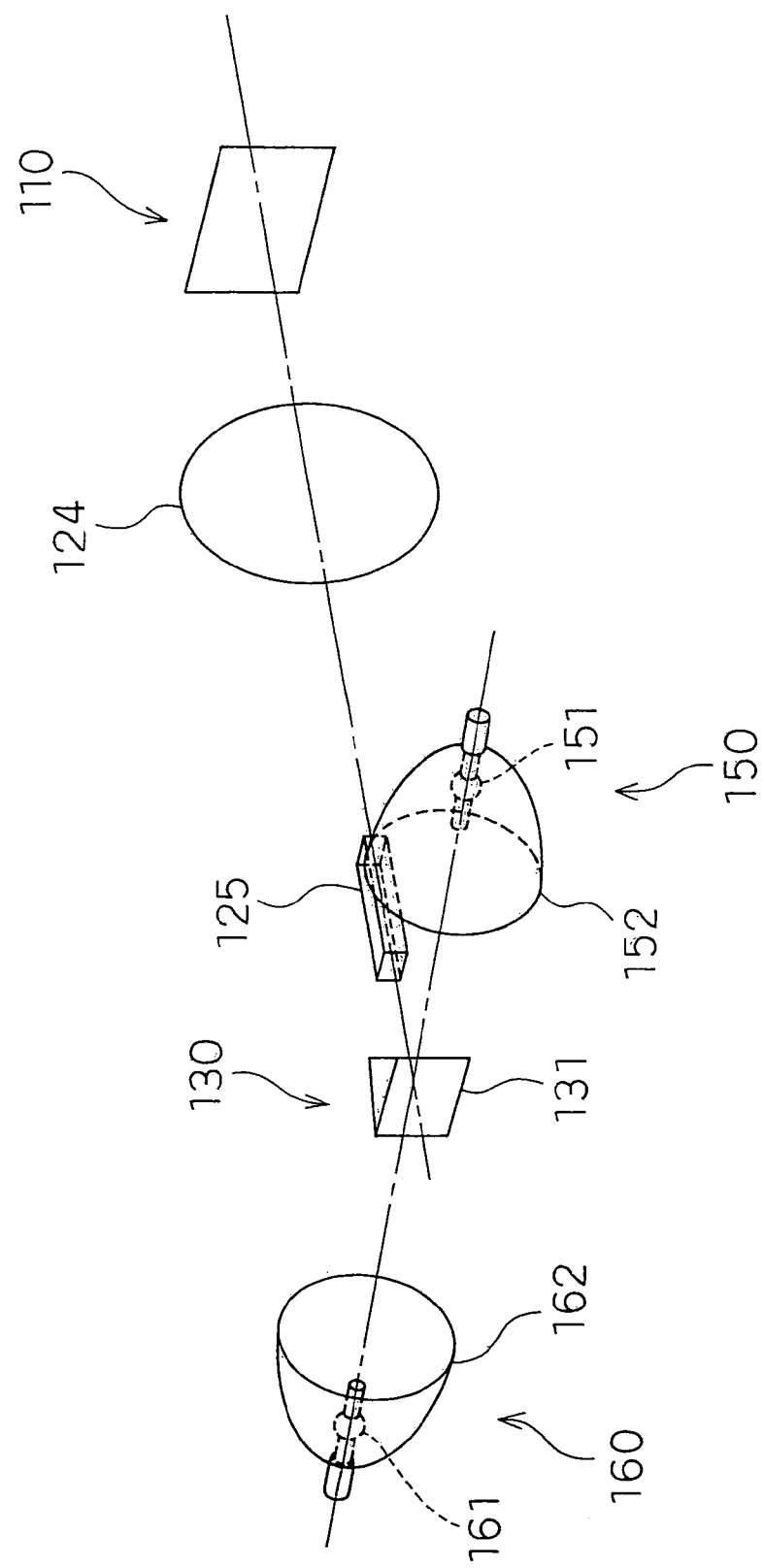
FIG. 11 is a schematic diagram showing the configuration of a conventional lighting apparatus.
Figure 12:
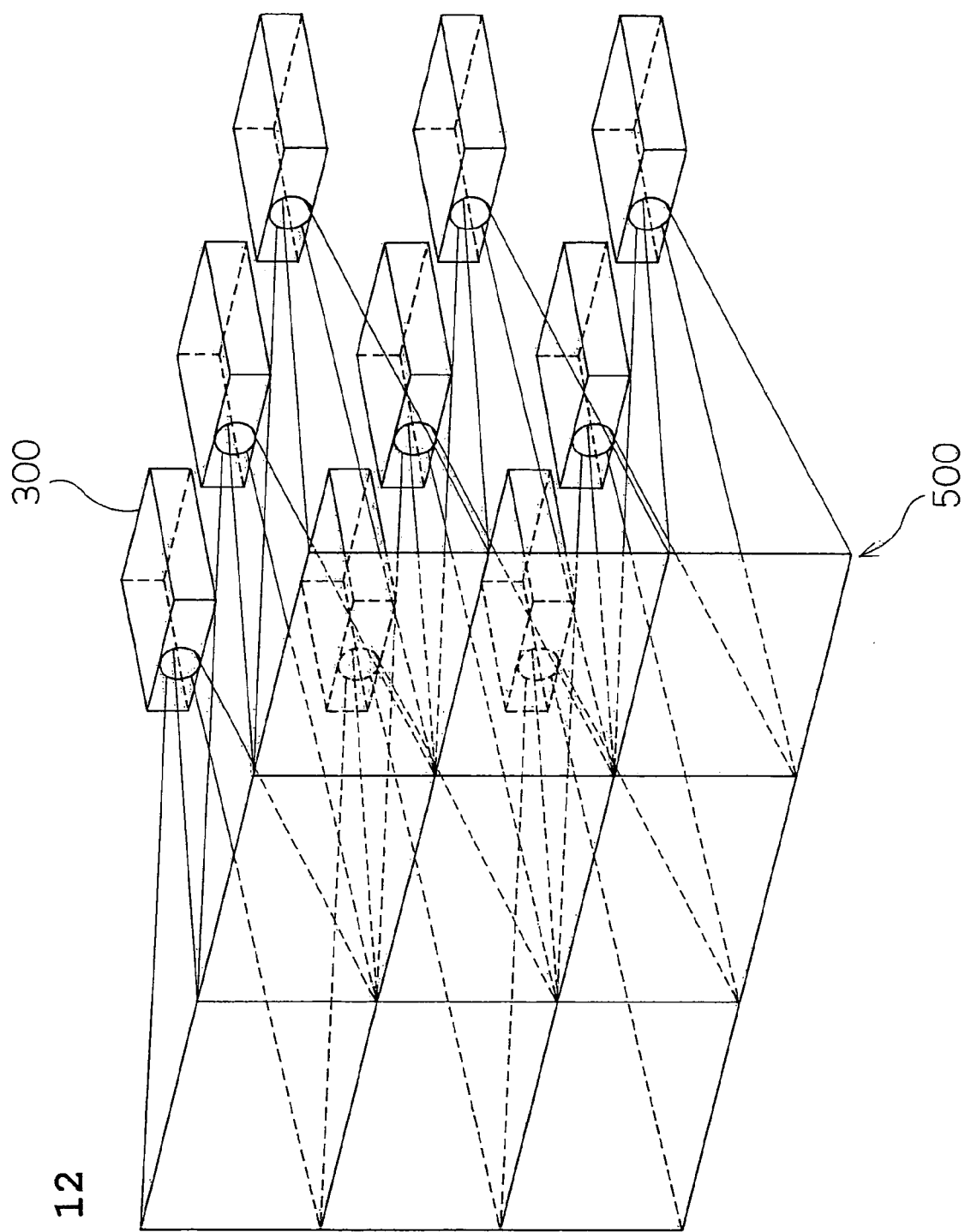
FIG. 12 is a diagram showing a conventional lighting apparatus system.
Figure 13:
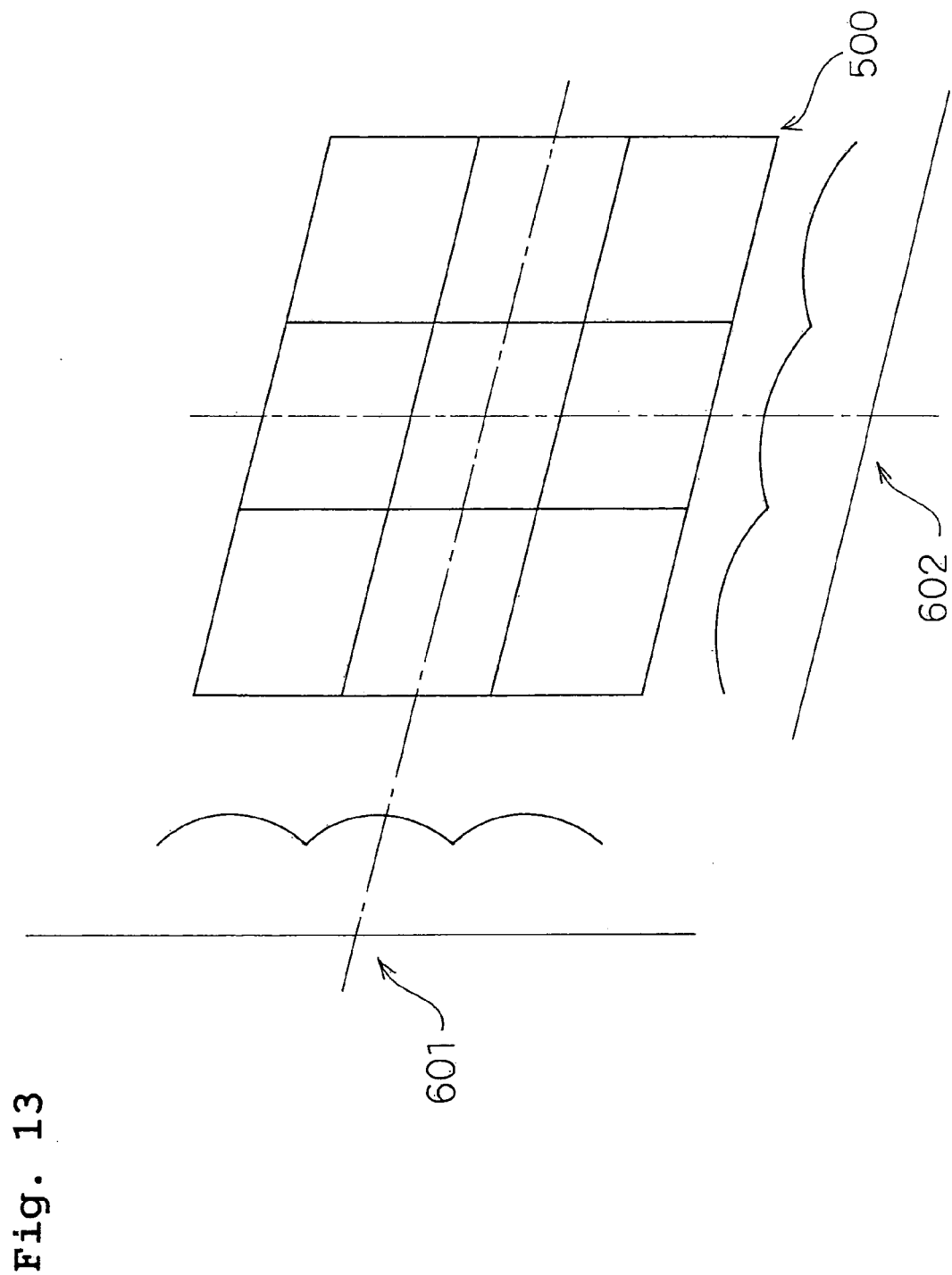
FIG. 13 is a diagram illustrating projective display provided by the conventional lighting apparatus system.

First, with reference to mainly FIG. 9 that is a diagram illustrating a projection type display apparatus of Embodiment 2 according to the present invention and projective display provided by the projection type display apparatus, the projection type display apparatus of the present embodiment will be described.

The projection type display apparatus of the present embodiment comprises nine projection type display apparatuses 200 configured similarly to the above described lighting apparatus of the present embodiment.

However, as described previously, the projection type display apparatus 200 comprises an image display device such as a transmission type liquid crystal panel and a projection lens.

In the present embodiment, the synthetic mirror section adjusting mechanism 140 (see FIG. 1) of each projection type display apparatus 200 is means that can change the position of the synthetic mirror section 130 (see FIG. 1) utilizing rotative movement that is a combination of (a) such parallel movement as keeps the bottom surface of the prism 131 (see FIG. 1) parallel with the plane containing the optical axis of the lamp unit section 150 (see FIG. 1) and the optical axis of the lighting unit section 120 (see FIG. 1) and (b) such movement as inclines the bottom surface of the prism 131 relative to the plane containing the optical axis of the lamp unit section 150 and the optical axis of the lighting unit section 120.

The projection type display apparatus of the present embodiment corresponds to the lighting apparatus system of the present invention.

Now, with reference to mainly FIGS. 1 and 9, description will be given of operations of the projection type display apparatus of the present embodiment.

Description will be given below of an operation of the synthetic mirror section adjusting mechanism 140 (see FIG. 1) which operation is characteristic of the operation of the projection type display apparatus of the present embodiment.

The synthetic mirror section adjusting mechanism 140 (see FIG. 1) of each projection type display apparatus 200 drives the synthetic mirror section 130 (see FIG. 1) utilizing rotative movement that is a combination of (a) such parallel movement as keeps the bottom surface of the prism 131 (see FIG. 1) parallel with the plane containing the optical axis of the lamp unit section 150 (see FIG. 1) and the optical axis of the lighting unit section 120 (see FIG. 1) and (b) such movement as inclines the bottom surface of the prism 131 relative to the plane containing the optical axis of the lamp unit section 150 and the optical axis of the lighting unit section 120.

Such a position change executed by the synthetic mirror section adjusting mechanism 140 (see FIG. 1) adjusts the position of the synthetic mirror section 130 (see FIG. 1) of each projection type display apparatus 200 so that a central portion of the entire 3×3 multiscreen 500 is brightest, while its peripheral portion is darkest.

More specifically, the position of the synthetic mirror section 130 of each projection type display apparatus 200 is adjusted so that in the entire 3×3 multiscreen 500, (1) the brightness distribution in the direction of the vertical axis is shaped like a mountain having one peak in a central portion as shown in a graph 501, while (2) the brightness distribution in the direction of the horizontal axis is shaped like a mountain having one peak in a central portion as shown in a graph 502.

For example, description will be given of the projection type display apparatus 200 located at the rightmost (arrow X points rightward) and uppermost (arrow Y points upward) position relative to the multiscreen 500. The position of the synthetic mirror section 130 is adjusted so that a corresponding small screen has the brightest part in its lower left portion and the darkest part in its upper right portion. For the projection type display apparatus 200 located at the leftmost and lowermost position relative to the multiscreen 500, the position of the synthetic mirror section 130 is adjusted so that a corresponding small screen has the brightest part in its upper right portion and the darkest part in its lower left portion.

Thus, high-grade display is realized so that a luminance gradient extends from the central to peripheral portion in the entire 3×3 multiscreen 500 with the maximum value present in the central portion.

A program of the present invention allows a computer to execute the functions of all or some means (or devices, elements, or the like) of the above described lighting apparatus and lighting apparatus system of the present invention, and cooperates with the computer.

Alternatively, a program of the present invention allows a computer to execute the operations of all or some steps (or processes, operations, action, or the like) of the above described lighting method of the present invention, and cooperates with the computer.

A recording medium of the present invention carries a program allowing a computer to execute the functions of all or some the means (or devices, elements, or the like) of the above described lighting apparatus and lighting apparatus system of the present invention so that the program that can be read and has been read by the computer cooperates with the computer in executing the functions.

Alternatively, a recording medium of the present invention carries a program allowing a computer to execute the operations of all or some steps (or processes, operations, action, or the like) of the above described lighting method of the present invention so that the program that can be read and has been read by the computer cooperates with the computer in executing the functions.

The expression "some means (or devices, elements, or the like)" as used herein means one or some of the plural means. The expression "some steps (or processes, operations, action, or the like)" as used herein means one or some of the plural steps.

Furthermore, the expression "functions of the means (or devices, elements, or the like)" as used herein means all or some functions of the means. The expression "operations of the steps (or processes, operations, action, or the like) means all or some operations of the steps. In one aspect, the program of the present invention may be recorded in a recording medium that can be read by a computer and may cooperate with the computer.

Alternatively, in one aspect, the program of the present invention may be transmitted through a transmission medium, read by a computer, and cooperate with it.

Furthermore, the recording medium includes a ROM, and the transmission medium includes the Internet or light, electric waves, or sound waves.

Moreover, the above described computer of the present invention is not limited to pure hardware such as a CPU. It may include firmware, an OS, or peripheral equipment.

As described above, the arrangement of the present invention may be implemented as software or hardware.

INDUSTRIAL APPLICABILITY

As is apparent from the above description, the present invention has the advantage of being able to improve the display quality of projective display.

The invention claimed is:

1. A lighting apparatus comprising:
 a plurality of light sources generating light;
 light reflecting and synthesizing means of reflecting and synthesizing lights generated by all or some of said plurality of light sources; and
 light reflecting and synthesizing means holding means of holding said light reflecting and synthesizing means so that a position of said light reflecting and synthesizing means can be changed so as to adjust reflecting optical paths of said reflected lights.

2. The lighting apparatus according to claim 1, further comprising light superimposing means of superimposing said reflected lights on each other, and light intensity distribution measuring means of measuring intensity distribution of said superimposed light,
 wherein said adjustment is carried out on the basis of a result of said measurement.

3. The lighting apparatus according to claim 1, further comprising light rotating means of rotating said reflected lights.

4. The lighting apparatus according to claim 1, wherein said light reflecting and synthesizing means is constructed utilizing a prism or a mirror.

5. The lighting apparatus according to claim 2, wherein said light superimposing means is constructed utilizing a lens array or a glass rod.

6. A lighting apparatus system comprising a plurality of lighting apparatuses according to claim 1,
 wherein the position of said light reflecting and synthesizing means of each of the lighting apparatuses is changed so as to meet a predetermined relationship.

* * * * *